United States Patent
Bantz et al.

(10) Patent No.: US 7,783,028 B2
(45) Date of Patent: Aug. 24, 2010

(54) SYSTEM AND METHOD OF USING SPEECH RECOGNITION AT CALL CENTERS TO IMPROVE THEIR EFFICIENCY AND CUSTOMER SATISFACTION

(75) Inventors: David F. Bantz, Portland, ME (US); Sara H. Basson, White Plains, NY (US); Dimitri Kanevsky, Ossining, NY (US); Dennis G. Shea, Ridgefield, CT (US); Frances W. West, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1510 days.

(21) Appl. No.: 10/954,785

(22) Filed: Sep. 30, 2004

(65) Prior Publication Data

US 2006/0072727 A1 Apr. 6, 2006

(51) Int. Cl.
*H04M 5/00* (2006.01)
*G10L 15/26* (2006.01)
*G10L 13/08* (2006.01)
(52) U.S. Cl. .................. 379/265.06; 704/235; 704/260
(58) Field of Classification Search ......... 379/265.02–266.01; 704/235, 260
See application file for complete search history.

(56) References Cited

U.S. PATENT DOCUMENTS

| | | | |
|---|---|---|---|
| 6,393,112 B1 | 5/2002 | Gottlieb et al. | |
| 6,587,558 B2 * | 7/2003 | Lo | .......... 379/265.09 |
| 6,604,077 B2 | 8/2003 | Dragosh et al. | |
| 6,707,889 B1 | 3/2004 | Saylor et al. | |
| 6,708,039 B2 | 3/2004 | Harder | |
| 2001/0049688 A1 * | 12/2001 | Fratkina et al. | .......... 707/104.1 |
| 2002/0169606 A1 * | 11/2002 | Bantz et al. | .......... 704/235 |
| 2003/0004722 A1 | 1/2003 | Butzberger et al. | |
| 2003/0115056 A1 | 6/2003 | Gusler et al. | |
| 2003/0115064 A1 | 6/2003 | Gusler et al. | |
| 2003/0115066 A1 | 6/2003 | Seeley et al. | |
| 2003/0179876 A1 * | 9/2003 | Fox et al. | .......... 379/265.02 |
| 2003/0191639 A1 | 10/2003 | Mazza | |
| 2004/0021700 A1 | 2/2004 | Iwema et al. | |
| 2004/0028191 A1 | 2/2004 | Engelke et al. | |
| 2004/0049385 A1 | 3/2004 | Lovance et al. | |
| 2005/0289582 A1 * | 12/2005 | Tavares et al. | .......... 725/10 |
| 2006/0230422 A1 * | 10/2006 | Kunin et al. | .......... 725/106 |

* cited by examiner

*Primary Examiner*—Curtis Kuntz
*Assistant Examiner*—Mohammad K Islam
(74) *Attorney, Agent, or Firm*—Scully, Scott, Murphy & Presser, P.C.; John R. Pivnichny

(57) ABSTRACT

Disclosed is a method, system and computer program for handing over a communication from a first party to a second party. The method comprises the steps of analyzing an audio communication with said first party for quality; and transcribing to text said audio communication with either a speech recognition function or a shadow or a human transcription service, based on said analyzing. The method comprises the further steps of editing the transcribed text; aligning said text with visual information viewed during said audio communication; and sending said transcribed text along with said visual information to said second party. The preferred embodiment of the invention provides a tool that can be used to great effect in the "Call Handover" scenario.

34 Claims, 8 Drawing Sheets

SYSTEM AND METHOD OF USING SPEECH RECOGNITION AT CALL CENTERS TO IMPROVE THEIR EFFICIENCY AND CUSTOMER SATISFACTION

BACKGROUND OF THE INVENTION

1. Field of the Invention

This invention generally relates to analyzing audio communications. More specifically, the invention relates to methods and systems for analyzing and transcribing to text audio communications. Even more specifically, the preferred embodiment of the invention relates to a system, method and computer program for using speech recognition at call centers to improve their efficiency and customer satisfaction.

2. Background Art

Call centers are becoming common in today's modern economy. In the operation of such centers, difficulties sometimes arise when a call is transferred from one representative, or rep, to another. To address this difficulty, U.S. patent application 2002/0169606 suggests using speech recognition to assist in call hand-overs in call center environments. Level 1 service reps will assist the caller to the extent possible, and the status of their assistance is captured via speech recognition, resulting in a more efficient hand-over to the level 2 service assistants. This system, however, does not have a mechanism to capture and display visual information that appeared on the screen during the initial assistance, what the level 1 service rep said at the time that particular screens were displayed, and detailed information about what the customer said during the discussion.

In addition, U.S. patent application 2002/016906 proposes using speech recognition to capture the service rep's speech, but no mechanism is proposed to address the issue of how to edit and correct the inevitable speech recognition errors. Further, given that the level 1 reps may not be based in the U.S. (or even if they are), the customer service rep could have an accent that interferes with customer understanding, which is not addressed in the above-identified patent application.

Telephone speech recognition is a growing business. Banks, travel agencies, etc., provide customer services that are supported by speech recognition instead of (or in addition to) touch-tone automation. One key problem is that speech degrades as it is transmitted over analog lines and this negatively impacts speech recognition accuracy. Because of this problem, only limited applications that use relatively small vocabularies and limited dialog grammars have flourished.

Speech recognition performance is much better, however, if it is transmitted through digital networks or high quality analog lines, and most large companies now have internal digital networks. But the customer service bureaus that customers call into are connected to these islands of high quality networks through limited bandwidth lines that degrade the speech quality. It is necessary to find a solution that allows undegraded speech signals to pass to call centers, despite the prevalence of low bandwidth networks.

Another problem with call centers relates to cost effectiveness, and in particular, the cost effectiveness of call centers that are outsourced, or placed in low cost foreign countries. In many of these offshore call centers, the quality of the cost center support is decreasing, but the investment in the CRM system is still quite high. So customers are struggling with the entire cost issue from the point of view of the return on investment. To address this issue, improvements are needed that will increase the cost center effectiveness, keep the labor costs down, but sill keep the efficiency up.

It is well understood in the art that customers who contact a call center with a question about a company's products or services can get very frustrated when they cannot understand the support people they are talking with. This may be due to the support people not having good English language skills, or having an accent that makes it difficult to understand them. The end result is customer frustration, and a possibly huge cost to the brand of the company about whom the customer called.

This requires a solution for the problem that one has a service rep with a phone accent. Then one has the customer on the other side of the telephone call not understanding that service rep.

Call centers can also be looked at from the point of view of customers, and also call center employees, with disabilities. There is the general framework of speech recognition in the call center, so that there is the issue of efficiency as telephone calls are passed off. So, starting from that, one can think about what can be done in order to create job opportunities in call centers for people with disabilities, and then from another side, now that one has the speech recognition capability, what can be done for customers, calling in, that have some sort of disability.

SUMMARY OF THE INVENTION

An object of this invention is to provide an improved procedure for handling calls to call centers.

Another object of the invention is to provide a method and system for handing over an audio communication at a call center, from a first party to a second party, and to provide the second party with information about the communication with the first party.

A further object of the present invention is to hand over a communication at a call center from the first help level representative to a second help level representative, and to provide that second help level representative with transcribed text and visual information about the communication at the first help level.

These and other objectives are attained with a method, system and computer program for handing over a communication from a first party to a second party. The method comprises the steps of analyzing an audio communication with said first party for quality; and transcribing to text said audio communication with either a speech recognition function or a shadow or a human transcription service, based on said analyzing. The method comprises the further steps of editing the transcribed text; aligning said text with visual information viewed during said audio communication; and sending said transcribed text along with said visual information to said second party.

The preferred embodiment of the invention, described in detail below, provides a tool that can be used to great effect in the "Call Handover" scenario. The speech and slides/visuals/websites used by the Level 1 rep can be easily captured—the audio, the text, and the visuals—and presented to the Level 2 rep. The Level 1 rep can also assume the role of "editor" to fix any speech recognition errors. This may replace his or her current "summarization" role". The text/audio/visuals can also be made available to the caller, who might want to track the progress of his or her request. The text may be segregated into public (caller-accessible) and private (helpdesk only) text.

Since the Level 1 rep might be based off-shore and have an accent, the caller might find particular value in being able to see the transcribed text. In addition to viewing the transcribed comments of the customer reps, this invention preferably provides a "re-synthesis" of the customer service rep's speech, in an accent more intelligible to the caller. Customer comments (while not captured via speech recognition) can be synchronously saved with the visual materials as audio files. Therefore, Level 2 or Level 3 assistants can determine in greater detail what occurred over the course of previous interactions.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
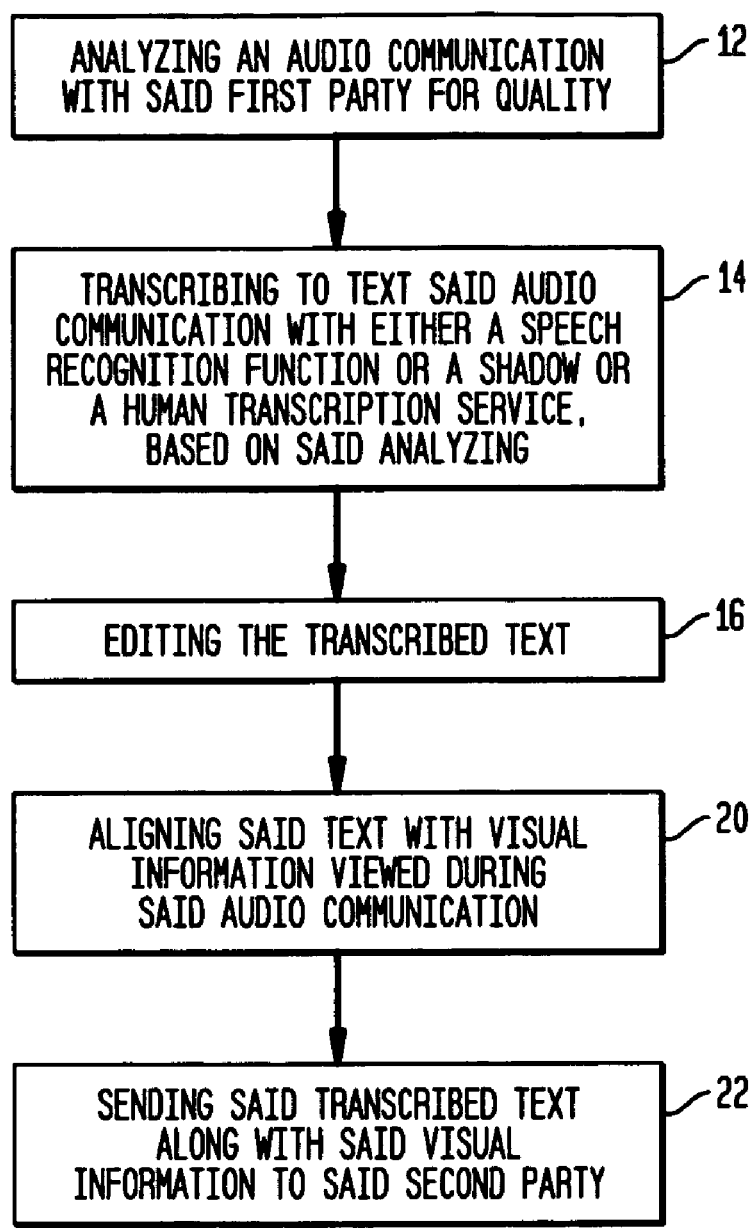
FIG. 1 is a flow chart showing a preferred method for implementing this invention.

The present invention provides a method, system and computer program for handing over a communication from a first party to a second party, and FIG. 1 shows a preferred method for carrying out the invention. In this method, step 12 is to analyze an audio communication with said first party for quality; and step 14 is to transcribe to text said audio communication with either a speech recognition function or a shadow or a human transcription service, based on said analyzing. At step 16, the transcribed text is edited; at step 20, said text is aligned with visual information viewed during said audio communication; and at step 22, said transcribed text is sent along with said visual information to said second party.

The preferred embodiment of the invention provides a tool that can be used to great effect in the "Call Handover" scenario. The speech and slides/visuals/websites used by the Level 1 rep can be easily captured—the audio, the text, and the visuals—and presented to the Level 2 rep. The Level 1 rep can also assume the role of "editor" to fix any speech recognition errors. This may replace his or her current "summarization" role." The text/audio/visuals can also be made available to the caller, who might want to track the progress of his or her request. The text may be segregated into public (caller-accessible) and private (helpdesk only) text.

In the operation of the call center, the level 1 rep, or first party, involves the communication between two "sub-parties" (one sub-party is a helper and the other sub-party is a requester for help). The communication of two sub-parties generates a complex communication message that involves at least two audio streams, automatic transcription of at least one audio stream (usually transcription of an audio from a helper) and communication of this complex communication message to the second party.

The level 2 rep, or second party, also involves two "sub-parties"—a helper and a requestor for help—and the media message is communicated to the second party in such a way to eliminate redundant questions from the requestor for help (i.e., questions that were asked during the communication on the first party level are not repeated on the second party level).

The complex communication media requires several variants of unique services like the following: an automatic speech recognition system is trained only for a helper, therefore the transcription is done for the audio of the helper and the shadowing is done for questions asked by the requestor. Similarly, audio analyzer is applied to a complex media and must extract and distribute different components of media between different service providers like automatic speech recognition system plus editing, shadowing, manual transcription, etc. In a particular case, the complex message that is received by the second party person can contain a mixture of transcribed text and untranscribed audio.

Since the Level 1 rep might be based off-shore and have an accent, the caller might find particular value in being able to see the transcribed text. In addition to viewing the transcribed comments of the customer reps, this invention preferably provides a "re-synthesis" of the customer service rep's speech, in an accent more intelligible to the caller. Customer comments (while not captured via speech recognition) can be synchronously saved with the visual materials as audio files. Therefore, Level 2 or Level 3 assistants can determine in greater detail what occurred over the course of previous interactions.

The technique for providing the understanding of accent may include using accent reduction in real time that reduces accent from a speaker voice. It also may use a speech synthesizer to replace accented speech. Display of complex message involves different kind of information text/audio/summary that allows to a use (from any party) to display either text or summary or play audio or all of them simultaneously and adjusted to users profile. Special case of user profiling is that it sends the complex message in the form that is adjusted to the customer accessibility condition (learning, dyslexia, hearing, vision).

Since many service calls are continuations of previous calls, it may be advantageous to present the history of interactions with the customer to the level 1 and level 2 reps. This history may be presented in a summary form but with the audio, text and visuals accessible to help understand the context of the call. It may be desirable to do some level of word-spotting in the current call (e.g., "the word help still doesn't work"), and use the word spotting to search the history of a previous call so that the rep can see what was reported and done in previous calls with respect to the spotted words. Spotted words can also be used to access a knowledge base automatically so that the rep can see all of the entries that relate to those words.

In order to provide this service, the service reps' speech may be recorded and transcribed. the recording can be available in both high bandwidth and telephony-filtered speech. The large volumes of recorded and transcribed data can be used as training data to enhance the accuracy of speech recognition algorithms.

In critical applications, like insurance industry claim processing, for example to process a claim when a car gets in an accident, when one calls in for help, or on Medicare claims, this feature of passing the information from level 1 to level 2, is very important. This is because the accent is individual. In this case, the response of the customer support rep, instead of being only a voice communication, actually shows, through the Internet, as corresponding text, a subtitle. In this way, one is using text data to supplement the understanding of the accent based on the information gathered. Such things can help the customer be satisfied.

On the job training can also be offered that targets specifically disabled people to become customer service support reps, and potentially at a lower, more competitive rate, which can compete with the offshore rates, improving the competitiveness of the Unites States versus other countries. This may also reduce the social cost of disabled people who are dependent on a social welfare system.

Figure 2:
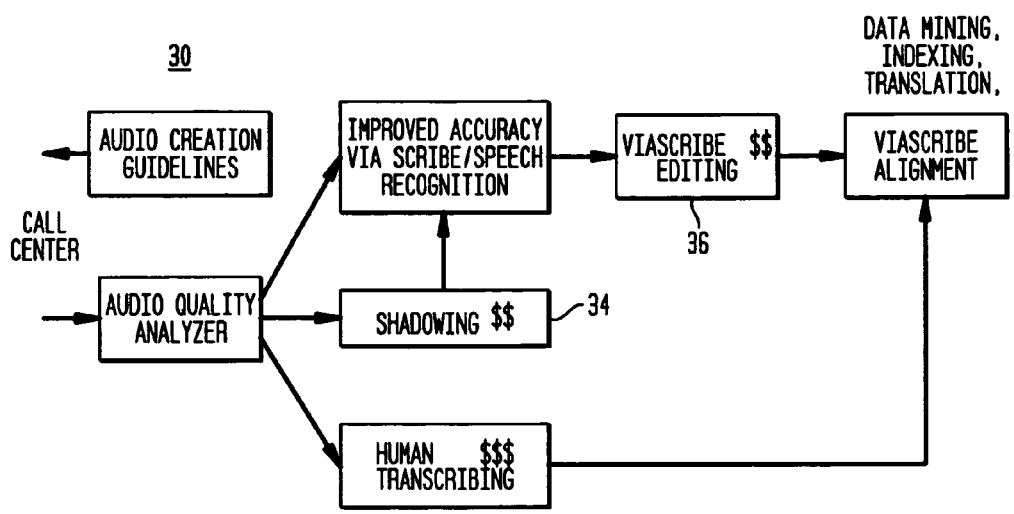
FIG. 2 illustrates the structure of a transcription call center service.
Figure 3:
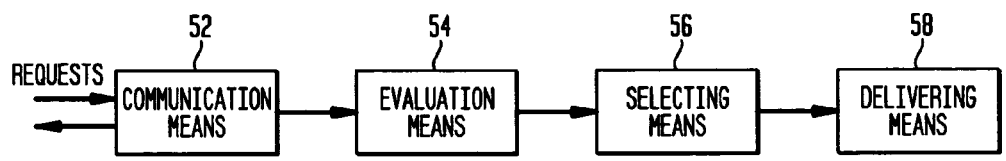
FIG. 3 is a block diagram schematically representing a call center.

The transcription call center service can have a structure that allows different providers to do different kinds of work that are needed for delivering high quality transcription. With reference to FIG. 2, the overall infrastructure of the call center transcription service 30 may be comprised of several components, including ASR, shadowing 34 (when a person who is trained in speech recognition repeats to the ASR what he or she hears), or editors using ViaScribe editor means 36 to correct errors. Editors can be call center help desk service providers or special people who are hired to provide such services. With reference to FIG. 3, the call center may comprise a means 52 of communication to send and receive requests and conditions for a service, a means 54 of evaluating and identifying the methods by which the service will be provided, a means 56 of selecting the lowest bidding provider to provide the requested service and allowing them access to the data, and a means 58 of delivering the requested material (i.e., transcribed audio file) back to the initial user.

Preferably, there are guidelines for people at the call centers who dictate to the ASR. These people use these guidelines on how to speak in order that their audio can be processed by speech recognition with a good quality. This means that these people need to follow these guidelines while they create the audio (e.g., have the correct microphone in the proper place).

There is an audio quality analyzer (automatic tools or even a person) somewhere on a server that estimates the quality of spoken speech by helpers at call centers to decide whether to route this audio to automated speech recognition, or to semi-automatic or manual speech recognition systems.

Preferably, the invention provides a mechanism to capture and display visual information during the initial assistance (visual information can include screen shots of a customer's display if a customer sits near a computer), a mechanism for editing and correcting the inevitable speech recognition errors in a complex message, and a technique to provide an understanding of accent with more efficiencies and satisfaction for both the customer service representative and the customers during the audio communication. The mechanism for editing and correcting contains the estimator of error rates and the efficiency estimator of using the editor given the estimated error rate.

Figure 4:
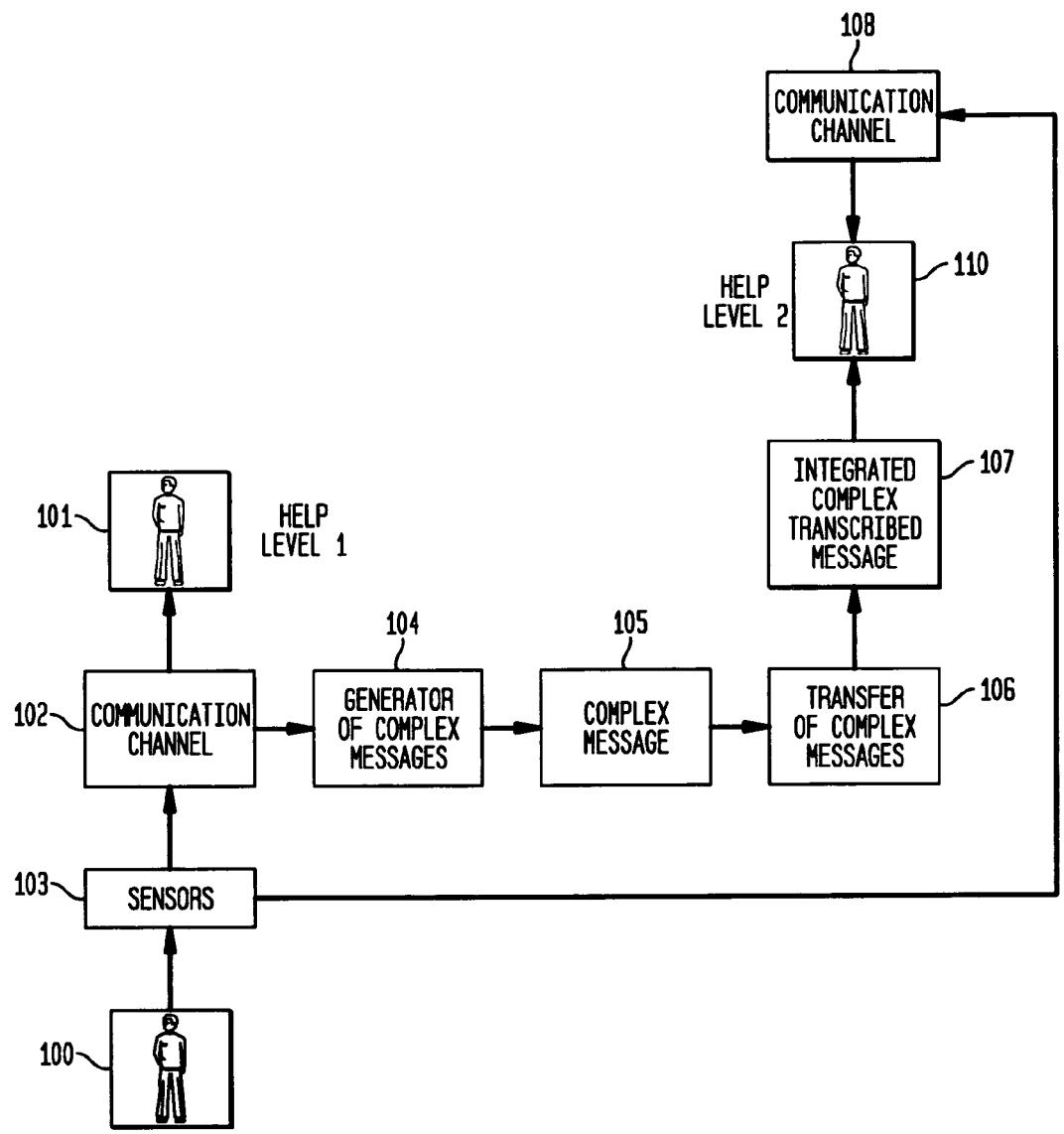
FIG. 4 is a block diagram of a call center.

FIGS. 4-9 show a more specific embodiment of this invention. FIG. 4 is a general block diagram of a call center. The center has two levels: Help level 1, 101, and help level 2, 110. User 100 can communicate with help level 1 via a communication channel 102 or with help level 2, via communication channel 108. These communication channels can include audio communication, radio communication, or video communication. A sensors block 103 is provided. It contains sensors that react for user data—so that each user can send information, like audio, video, and from devices. Block 104 represents a generator of complex message.

Information from communication channel 102 moves into generator 104, and a complex message is produced that may contain audio, video information, text, picture. The message can contain scripts from the user's computer, information about the devices that the user uses. For example, from devices in an automobile.

Generator of complex message 104 produces a complex message 105. This complex message is transcribed in the block 106, which transcribes complex messages. Some parts of the message, like audio, are transcribed and pictures can be labeled. Pictures can have textual description. The transcription of the complex message produces integrated complex transcribed message 107. Message 107 contains original complex message 105, together with a transcription and labels, and additional information, like summarization, translation, and other information that helps to make understanding of the complex message easier.

Help level 110 receives the integrated complex transcribed message, and uses this message to communicate with user 100, via communication channel 108. This message helps to reduce the number of questions that help level 2 would ask user 100 to detect a problem or to provide answers.

Figure 5:
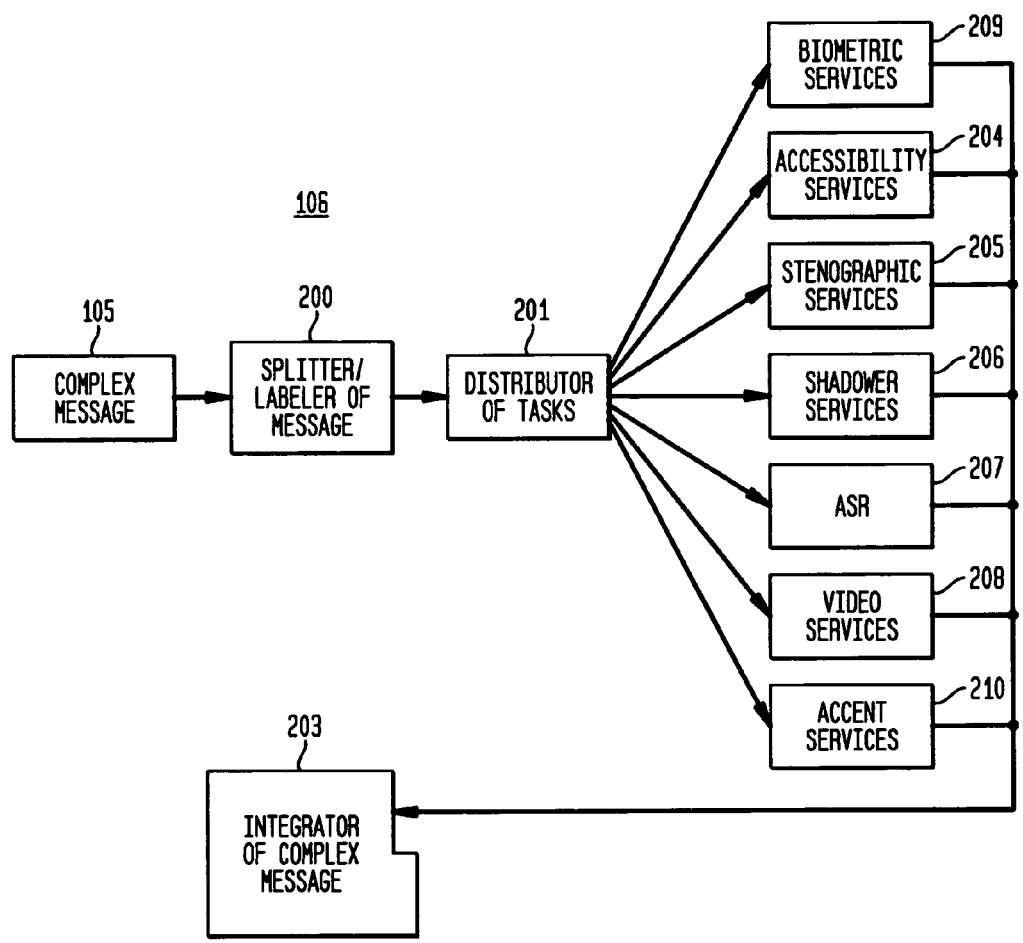
FIG. 5 shows in more detail the transfer of complex messages block of FIG. 4.

FIG. 5 is a more detailed diagram of block 106, which transcribes complex messages. Complex message 105 enters a block splitter labeler of messages 200. Split and labeled messages go into block 201, which is a distributor of tasks. These tasks are distributed between various servers or services, like biometric services 209, accessibility services 204, stenographic services 205, shadowing services 206, speech recognition 207, video services 208, and accessibility related services 220. Each of these services performs tasks.

Biometric services, for example, identify who is speaking. This service determines what emotions people have. Are they happy or angry? Accessibility service helps to provide messages in accessible form. For example, this service may transcribe audio for a deaf person, or provide descriptions of pictures for a blind person, or simplify messages for children or for people with various cognitive disorders.

Certain services provide a transcription of audio, like shadowing, which is the restating of speech by a special person through speech recognition that is trained for this purpose.

Speech recognition directly transcribes speech. Video services work with the video. They can compress video, change format, describe video and align video with audio. Accent services can normalize voices to make them better understood. In block 203, after the complex messages are processed by various services, the complex messages are integrated from output from all the services.

Figure 6:
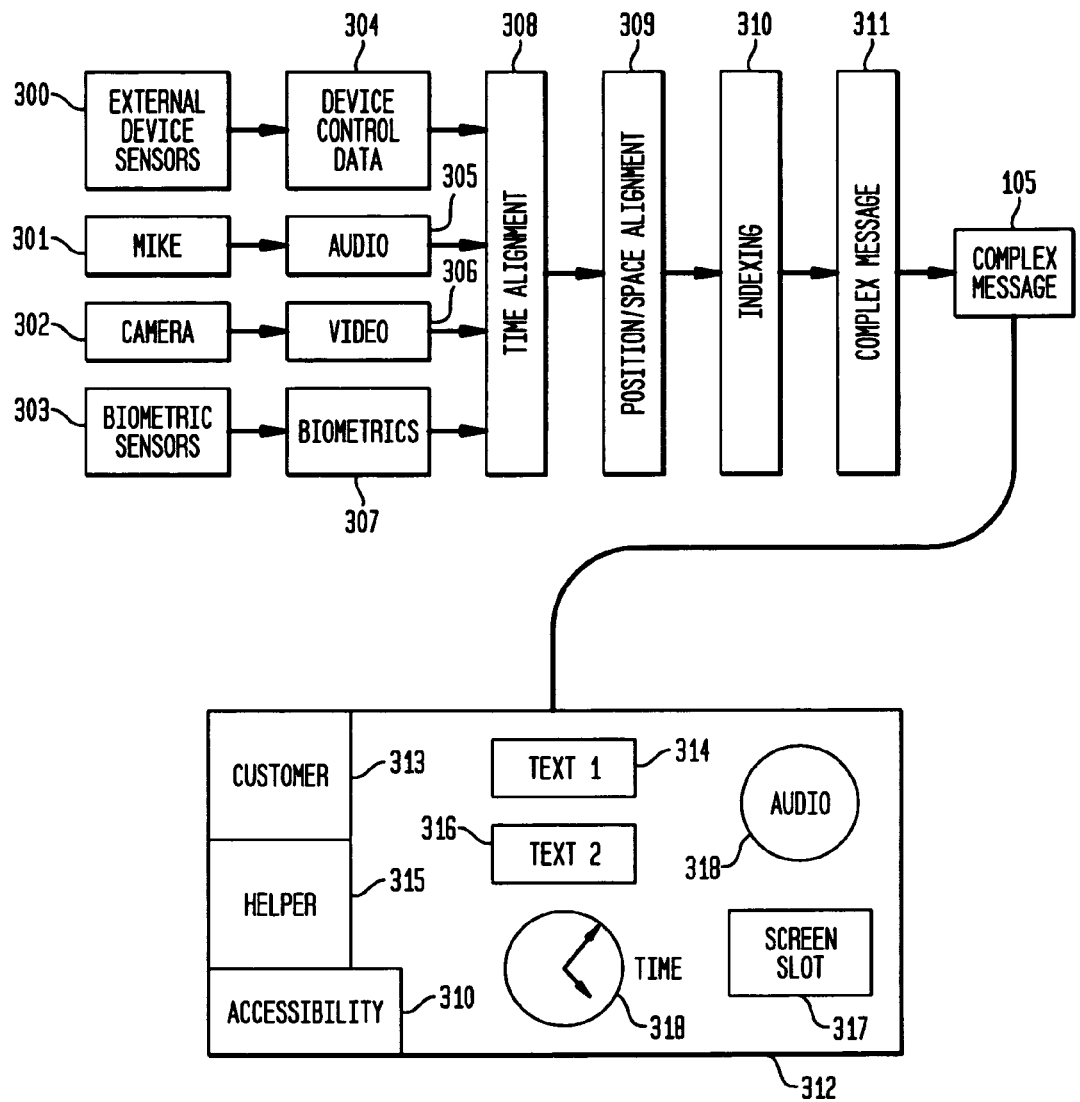
FIG. 6 describes the generation of complex messages block of FIG. 4.

FIG. 6 describes the block 104—the generator of complex messages. It also describes complex message 105 and sensors block 103. Examples of sensors are microphone 301, camera 302, biometric sensors 303, or internal device sensors 300. (In the help desk that helps for some devices, e.g. for cars). For example, there are diagnostic sensors in a car that help to detect conditions of a car. For example, if the tire is flat, or level for gas or speed, or something is broken, each of these sensors produces data, device comes from data in block 304, audio data in block 305, video data in block 306, and biometrics in block 307. In block 308, this data is time aligned. This is a time alignment block.

In block 309, this data is position and space aligned. For example, the transcription is placed near the audio and linked with audio, and pictures are placed near text. In block 310 this data is indexed, so it can be searched; and in block 311, the complex message is labeled with user identification so it identifies which part is produced by which user.

After this, complex message 105 is generated. An example of this complex message is represented at 312. It includes customer data 313, data 315, text 310, which is produced by the helper, and recorded audio 318 for the customer. For example, 312 may also contain time data and screen shot 317 and some accessibility data.

Figure 7:
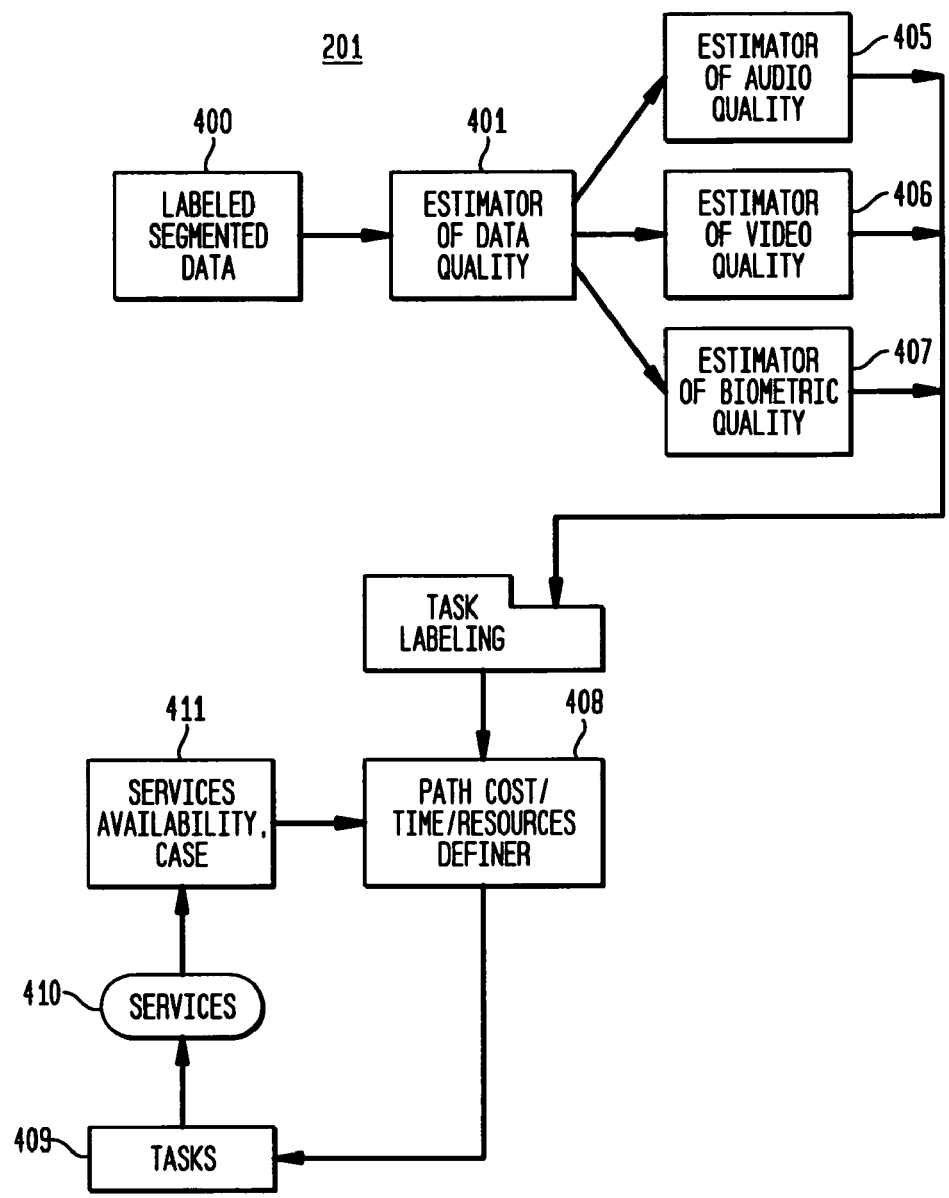
FIG. 7 describes the distributor of tasks block of FIG. 5.

FIG. 7 describes the block 201, which is the distributor of tasks. Block 201 includes a block 400 of labeled and segmented data. Segmented data is estimated for quality in block 401. For example, 405 represents an estimate of audio quality. Audio quality is estimated to determine what kind of transcription method can be used. If the data is very clean, one can use speech recognition to transcribe the data. If the data is noisy, one can use speech recognition that uses noise reduction, or one can use manual transcription services.

Block 406 represents an estimate of the video quality, and block 407 represents an estimate of biometric quality. It is needed in order to determine, for example, if biometric data is sufficient to do user identification or whether additional identification is required. The emotions of people may also be estimated. Block 420 is provided for task labeling. After task labeling, block 408 is used to choose the most efficient path to process this data. Block 408 includes path cost, time and resources—block 408 is a definer of time, cost and resources. Then when the most efficient path is determined, block 409 is used to define what kind of tasks are given to what kind of services. When the path course is estimated, that path is connected to services availability cost 411.

Figure 8:
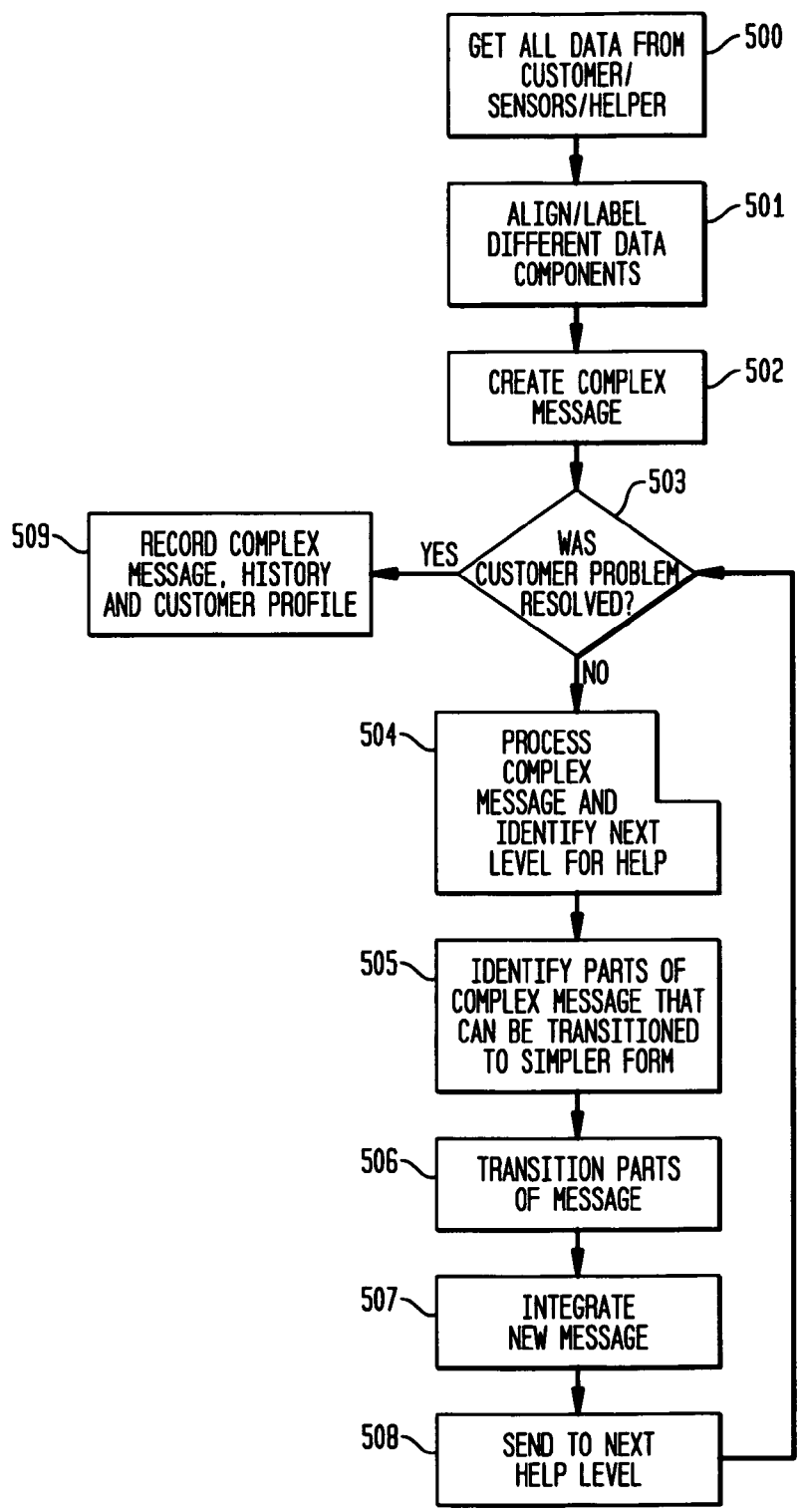
FIG. 8 illustrates a method that may be used to implement the invention.

FIG. 8 illustrates a specific method that may be used to implement this invention. In block 500, data are obtained from customer sensors for the user and the helper. In block 501, different data components are aligned. In block 502, complex messages are created. In block 503, the method checks whether the customer problem is resolved. If the problem is resolved, then in block 509, the complex messages are recorded in history, and customer preference database. If the problem is not resolved, then the method processes the complex message and identifies the next level for help in 504.

In 505, the process identifies the path of complex message that can be transformed to simple form. Then the method transforms part of the message in 506, integrates a new message at 507. Send to next help level 508, and again check to determine if the customer problem was resolved.

Figure 9:
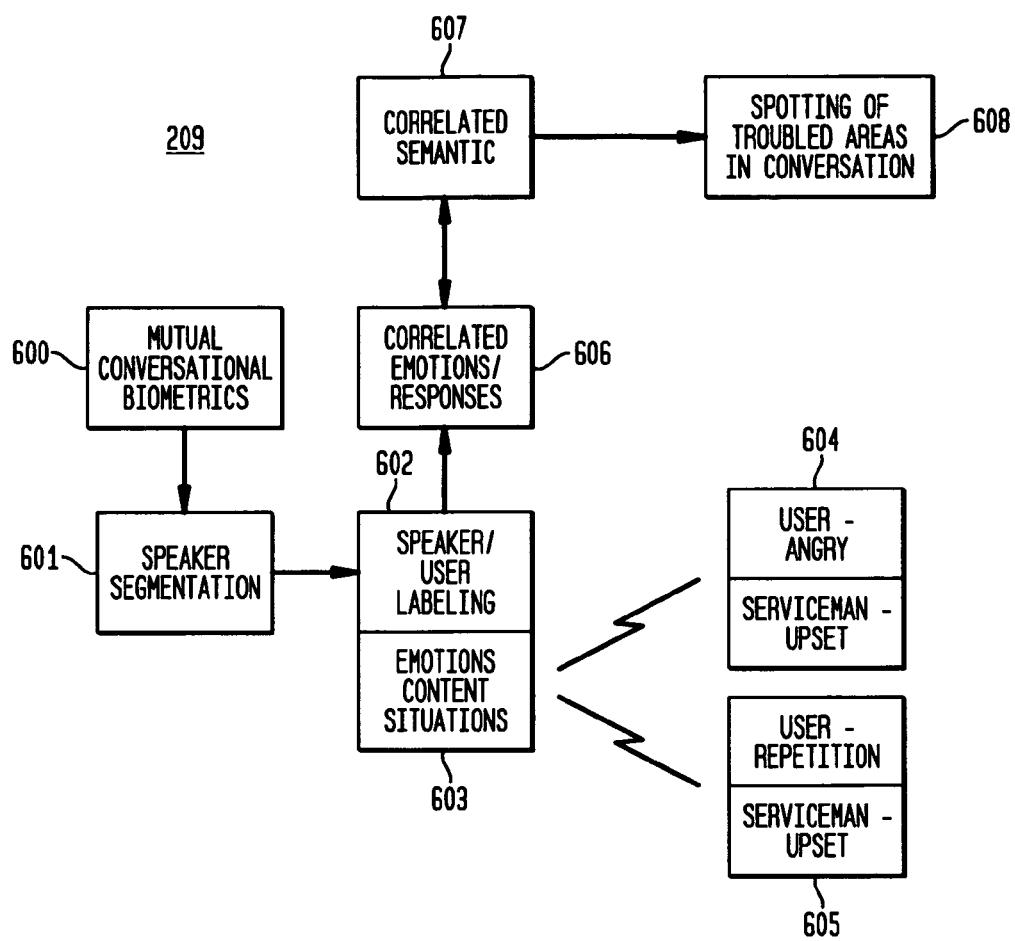
FIG. 9 describes the biometric services block of FIG. 5.

FIG. 9 describes biometrics model 209. This model includes a module 600 for mutual conversational biometrics. This is biometrics that are created when two or more people are talking. For example, when a helper and the user are talking, it creates mutual biometrics.

Mutual conversational biometrics is processed as follows. This process contains speaker segmentation 601 to identify who is speaking. Then after correlations of data with speakers, it identifies speaker emotions; what context are they speaking in 602 and 603. It defines what situations surround the speakers.

For example, block 604 shows that the user is angry and the serviceman is upset, so there is a situation where the user is angry with the service, and a serviceman became upset. Using this combination of biometrics for the user and serviceman, make it easier to detect and label situation and reduce mistakes in recognition biometrics. Another example, 605, the user repeats a word or phrase several times, and the serviceman is upset.

Block 606 correlates emotion and responses, so one can correlate emotion of helper and response of user or serviceman. Block 607 correlates semantic meaning, so it correlates semantics of what was spoken to emotion. For example, it can detect that a user said a certain word and the serviceman is upset. All this information goes to block 608 for spotting troubled areas in conversation. It helps immediately to detect what problem should be fixed when this information goes to another help level.

The invention also suggests installing ASR servers at edges of the islands with good network connections (for example, at the switches that connect the internal digital network in a company with the external network). The locally placed speech recognition capability would transcribe caller speech derived from phones in this good island area and then forward textual data to the destination points. Alternatively, speech can be digitized locally at a single collection point in the high-bandwidth area, and transmitted via cepstra to the destination points where the speech recognition technology resides.

The present invention may also use word spotting with a search engine, so that, for example, if the caller says "Windows XP," then the search engine locates all documents relevant to Windows XP. Then the caller says "firewall" and the previous results only are searched for documents relative to Windows XP and firewall. Thus, as the caller is interacting with the agent, the agent sees progressively more specific and complex search engine queries. The tree (or succession) of search terms would be shown visually so that the agent could edit the search terms, thus speeding up the process of obtaining relevant documents.

The present invention may be used in may specific situations and can be used to provide many types of services. For example, a bank can negotiate with companies with a good internal network, permission to install replicas of the banks' ASR applications at the site of their network switches. Alternatively, a bank can arrange to have companies with digital switches to create digitized speech signals locally, and the bank's ASR application can then still reside at the bank's site. The negotiations with companies and ASR installation or digitized extraction can be provided by special service centers.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of handing over a communication from a first party to a second party, comprising:

analyzing, by using a computer, an audio communication between a caller and said first party to determine a quality level of said audio communication, including a level of noise in said audio communication and an accent of said first party;

on the basis of said determined quality level, including said level of noise in said audio communication and said accent of said first party, selecting, by using said computer, one of a plurality of given procedures to transcribe said audio communication;

transcribing to text said audio communication using said selected procedure;

editing the transcribed text;

aligning said text with visual information viewed during said audio communication; and sending said transcribed text along with said visual information to said second party.

2. A method according to claim 1, wherein said transcribing step includes the step of transcribing comments made by said first party during said audio communication, and said method comprises the further step of showing said transcribed text to said person who calls said call center.

3. A method according to claim 1, comprising the further steps of:

identifying one or more words from the audio communication; and locating a set of documents relevant to said identified one or more words.

4. A method according to claim 3, comprising the further steps of:

identifying one or more additional words from the audio communication; and searching through said set of documents for a subset of said set of documents relevant to said identified one or more additional words.

5. A method according to claim 1, wherein:

said audio communication with said first party is an audio communication between said first party and a third party; and the transcribing step includes the step of transcribing comments made by said first party during said audio communication.

6. A method according to claim 5, further comprising the step of saving as an audio file comments made by said third party during said audio communication.

7. A method according to claim 5, further comprising the step of showing said transcribed text to said third party.

8. A method according to claim 1, comprising the further steps of adding data to the text, and indexing said text and the data added to said text, so that said text and said added data is accessible and can be searched.

9. The method according to claim 1, comprising the further steps of:

generating a complex message from the audio communication;

splitting the complex message into a plurality of parts;

distributing each of said parts to a respective one service tool; and each of the service tools analyzing a respective one aspect of the audio communication.

10. The method according to claim 9, wherein the service tools include:

a biometrics service for identifying defined emotions of the caller and said first party; and an accent service to normalize voices having accents to make the voices better understood.

11. A system for handing over a communication from a first party to a second party, comprising a computer configured for:

analyzing an audio communication between a caller and said first party to determine a quality level of said audio communication, including a level of noise in said audio communication and an accent of said first party;

on the basis of said determined quality level, including said level of noise in said audio communication and said accent of said first party, selecting one of a plurality of given procedures to transcribe said audio communication;

transcribing to text said audio communication using said selected procedure;

editing the transcribed text;

aligning said text with visual information viewed during said audio communication; and sending said transcribed text along with said visual information to said second party.

12. A system according to claim 11, wherein the First party also involves the communication between two sub-parties; the communication of two sub-parties generates a complex communication message that involves at least two audio streams, automatic transcription of at least one audio stream, sensor data, biometrics and communication of this complex communication message to the second party; the second party involves communication between a helper and a requester for help, and the media message is communicated to the second party in such a way to eliminate redundant questions that were asked during the communication with the first party.

13. A system according to claim 11, wherein:

said first party is at a call center;

said audio communication is between said first party and a person who calls the call center; and said first party is a level one representative at the call center, and said second party is a level two representative at the call center.

14. A system according to claim 13, wherein there is a history of interaction between said caller and said call center, and the computer is further configured for presenting said history to at least one of said first and second parties.

15. A system according to claim 11, wherein said transcribing includes transcribing comments made by said first party during said audio communication, and said computer is further configured for showing said transcribed text to said person who calls said call center.

16. A system according to claim 11, wherein:

said audio communication with said first party is an audio communication between said first party and a third party;

the transcribing includes transcribing comments made by said first party during said audio communication; and wherein said computer is further configured for:

saving as an audio file comments made by said third party during said audio communication; and showing said transcribed text to said third party.

17. A system according to claim 11, wherein the computer is further configured for indexing said text so that said text is accessible and can be searched.

18. A method of assisting a customer who calls a service representative, comprising the steps of:

analyzing, by using a computer, an audio communication between the customer and the service representative to determine a level of quality of said audio communication, including a level of noise in said audio communication and an accent of said first party;

on the basis of said determined quality level, including said level of noise in said audio communication and said accent of said first party, selecting, by using the computer, one of a plurality of given procedures to translate said audio communication;

providing a mechanism to capture and display visual information during the audio communication;

providing a mechanism for editing and correcting; and providing a technique to provide an understanding of accent with more efficiencies and satisfaction for both the customer service representatives and the customers during the audio communication;

wherein the mechanism for editing and correcting contains an estimator of error rates and an efficiency estimator of using the editor given the estimated error rate.

19. A program storage device readable by machine, tangibly embodying a program of instructions executable by the machine to perform method steps for handing over a communication from a first party to a second party, the method steps comprising:

analyzing, by using a computer, an audio communication between a caller and said first party to determine a quality level of said audio communication, including a level of noise in said audio communication and an accent of said first party;

on the basis of said determined quality level, including said level of noise in said audio communication and said accent of said first party, selecting, by using said computer, one of a plurality of given procedures to transcribe said audio communication;

transcribing to text said audio communication using said selected procedure;

editing the transcribed text;

aligning said text with visual information viewed during said audio communication; and sending said transcribed text along with said visual information to said second party.

20. A program storage device according to claim 19, wherein:

said first party is at a call center;

said audio communication is between said first party and a person who calls the call center; and said first party is a level one representative at the call center, and said second party is a level two representative at the call center.

21. A program storage device according to claim 20, wherein said transcribing step includes the step of transcribing comments made by said first party during said audio communication, and said method steps further comprise the step of showing said transcribed text to said person who calls said call center.

22. A program storage device according to claim 20, wherein there is a history of interaction between said caller and said call center, and said method steps further comprise the step of presenting said history to at least one of said first and second parties.

23. A program storage device according to claim 19, wherein:

said audio communication with said first party is an audio communication between said first party and a third party; and the transcribing step includes the step of transcribing comments made by said first party during said audio communication; and wherein said method steps further comprise the steps of:

saving as an audio file comments made by said third party during said audio communication; and showing said transcribed text to said third party.

24. A method of deploying a computer program product for handing over a communication from a first party to a second party, wherein when executed, the computer program performs the steps of:

analyzing, by using a computer, an audio communication between a caller an said first party to determine a quality level of said audio communication, including a level of noise in said audio communication and an accent of said first party;

on the basis of said determined quality level, including said level of noise in said audio communication and said accent of said first party, selecting one of a plurality of given procedures to transcribe said audio communication;

transcribing to text said audio communication using said selected procedure;

editing the transcribed text;

aligning said text with visual information viewed during said audio communication; and sending said transcribed text along with said visual information to said second party.

25. A method according to claim 24, wherein:

said first party is at a call center;

said audio communication is between said first party and a person who calls the call center; and said first party is a level one representative at the call center, and said second party is a level two representative at the call center.

26. A method according to claim 25, wherein said transcribing step includes the step of transcribing comments made by said first party during said audio communication, and said method steps further comprise the step of showing said transcribed text to said person who calls said call center.

27. A method according to claim 25, wherein there is a history of interaction between said caller and said call center, and said method steps further comprise the step of presenting said history to at least one of said first and second parties.

28. A method according to claim 24, wherein:

said audio communication with said first party is an audio communication between said first party and a third party; and the transcribing step includes the step of transcribing comments made by said first party during said audio communication; and wherein said method steps further comprise the steps of:

saving as an audio file comments made by said third party during said audio communication; and showing said transcribed text to said third party.

29. A method of handing over a communication from a first party to a second party, comprising the steps of:

establishing a communication between a person and said first party;

analyzing, by using a computer, an audio communication between the caller and the service representative; to determine a level of quality of said audio communication, including a level of noise in said audio communication and an accent of said first party;

on the basis of said determined quality level, including said level of noise in said audio communication and said accent of said first party, selecting, by using the computer, one of a plurality of given procedures to translate said audio communication;

receiving sensory data about said communication or said person;

generating a message based upon said communication;

transcribing said message;

adding more information to said message to form an integrated message; and visually displaying to said second party said integrated message and information about said received sensory data to help said second party communicate with said person.

30. A method according to claim 29, wherein said communication between said person and said first party includes one or more of the following: an audio communication, a radio communication, or a video communication.

31. A method according to claim 29, wherein said sensory data includes one or more of the following: biometric data, vice data, or video data.

32. A method according to claim 29, wherein the step of adding more information to said method includes the step of using one or more of the following services to add said more information: biometric services, accessibility services, stenographic services, shadower services, ASR services, video services, or accent services.

33. A method according to claim 29, wherein said more information includes one or more of the following: summarization, translation, or other information that helps to make understanding of the integrated message easier.

34. A method according to claim 29, comprising the further step of indexing said more information so that said more information is accessible and can be searched.

* * * * *